United States Patent Office 3,029,044
Patented Apr. 10, 1962

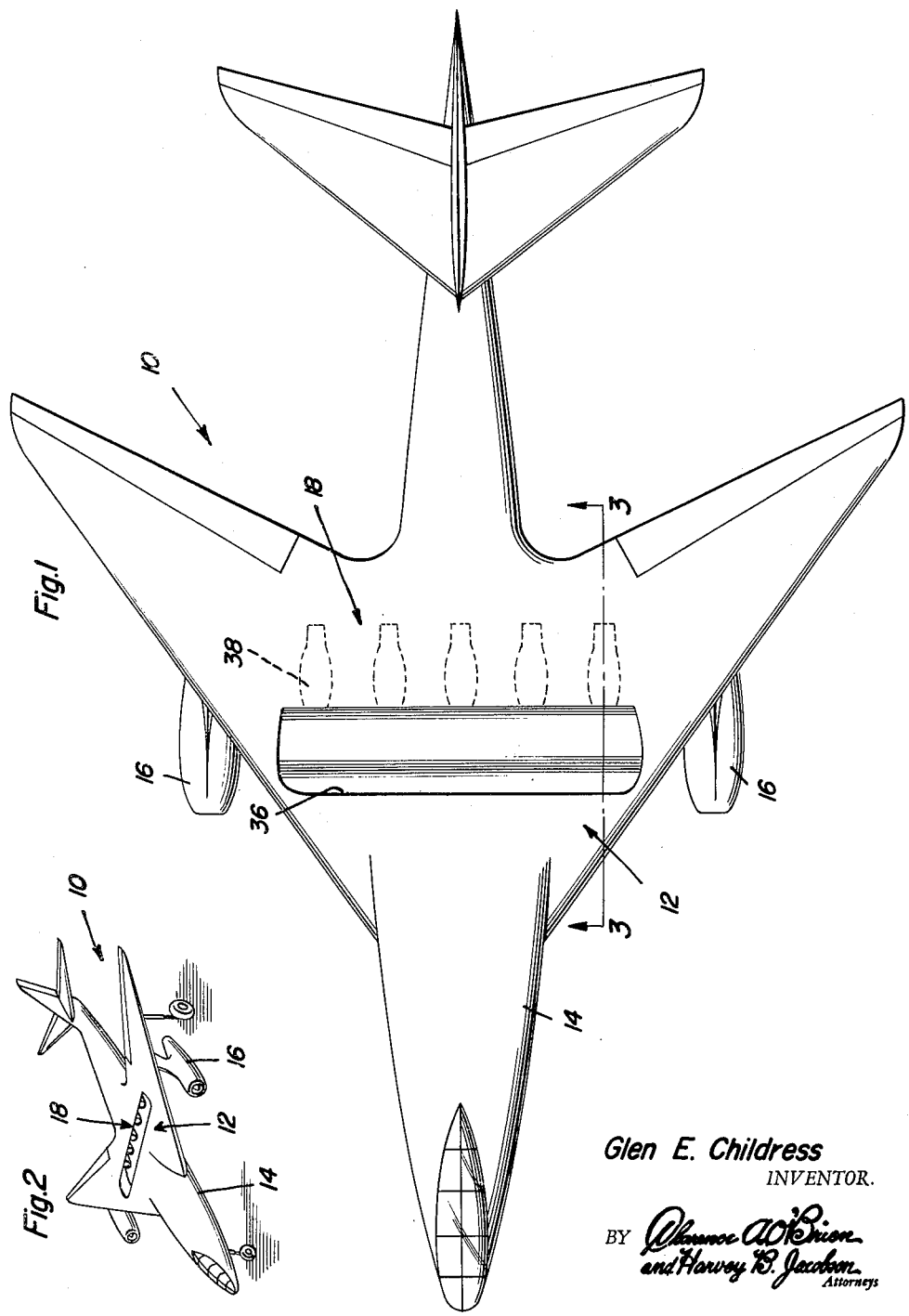

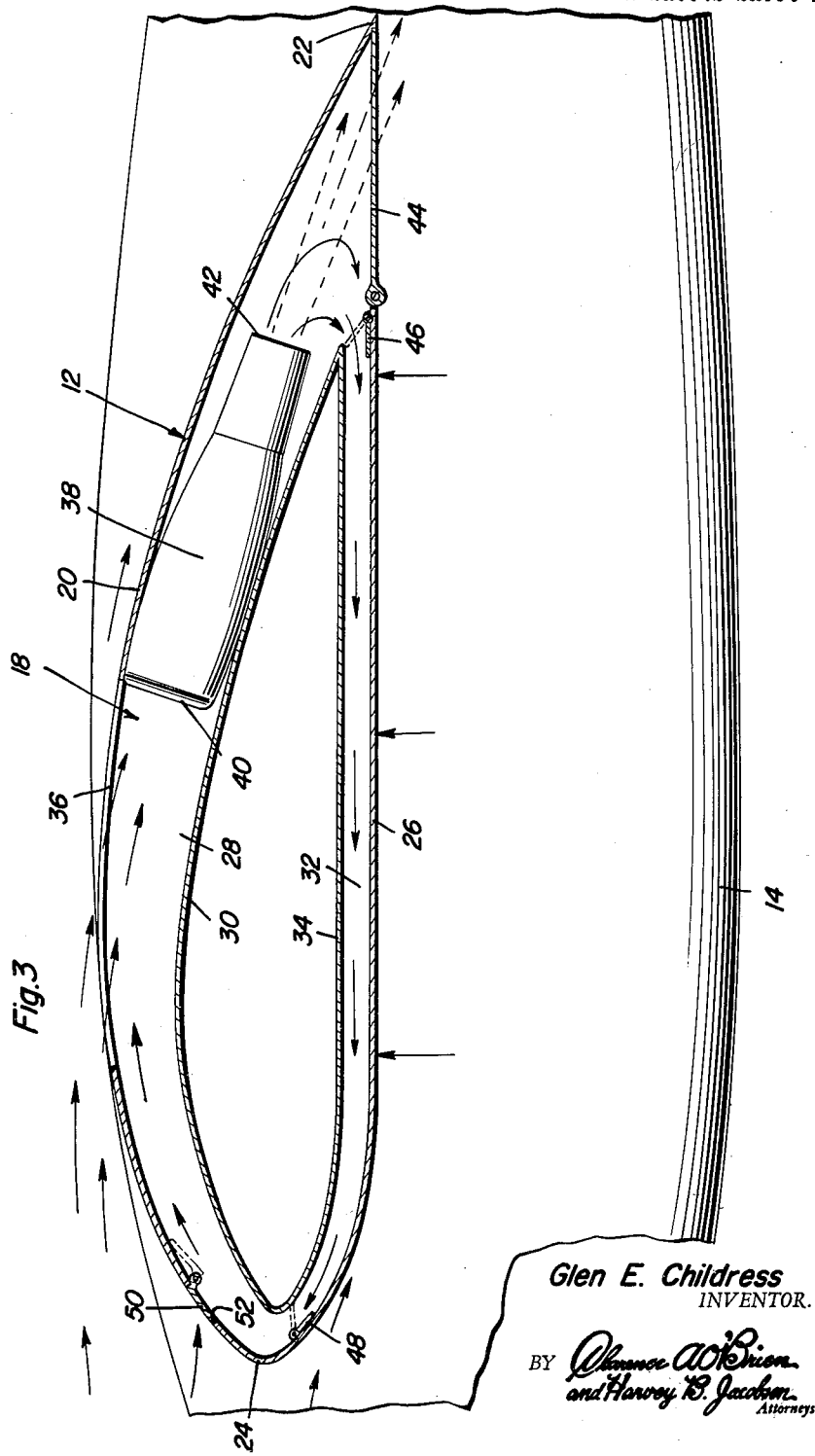

3,029,044
RETURN FLOW VERTICAL LIFT AIRPLANE
Glen E. Childress, Rte. 2, Hebron, Ind.
Filed Aug. 9, 1960, Ser. No. 48,490
4 Claims. (Cl. 244—12)

This invention relates to aircraft which includes means for enabling it to take-off in a vertical direction without reliance on the forward propulsion of the aircraft.

The problems involved in the take-off characteristics of high speed aircraft is of constant concern to aircraft designers today. It will be appreciated therefore, that because of the high speed propulsion units available today for aircraft such as jet and rocket engines long runways are required. Accordingly, various means have been proposed in order to effect vertical take-off of such high speed aircraft prior to the firing of their jet or rocket engines which produce the forward thrust on the air frame. Accordingly, various cumbersome and often unsatisfactory arrangements have been resorted to such as the use of rotating wings or pivoting mounting of the propulsion unit for inducing vertical thrust on the air frame in order to effect the vertical take-off prior to forward thrust motion of the aircraft. Many other proposals for solving the take-off problem involves increasing the aerodynamic lift at a higher rate as the aircraft is being propelled forwardly during take-off. It is therefore a primary object of this invention to provide means in a high speed type aircraft which will enable vertical take-off thereof prior to forward propulsion of the aircraft by the thrust propelling unit, said vertical take-off means therefore not relying on the forward motion of the aircraft and yet enabling vertical take-off by means of an aerodynamically induced lift accomplished without the use of directed thrust means or the use of cumbersome rotating wings as has heretofore been proposed.

Another object of this invention in accordance with the foregoing objects, is to provide mechanism for inducing aerodynamic vertical lift on an aircraft which mechanism is subsequently rendered ineffective after the aircraft is airborne and the vertical thrust units are operative to propel the aircraft forwardly so as to produce the usual type of aerodynamic lift on the airfoil of the aircraft.

The principles on which the vertical lift mechanism for the aircraft constructed in accordance with this invention rely are related to the phenomena occurring in a recirculating type of wind tunnel in which an air pump or blower induces the flow of air therethrough the velocity of which is further increased by returning the air flow through the air pump or blower by means of a converging channel. The velocity of the air flow through such a recirculating type of wind tunnel is thereby raised to a considerable magnitude as compared to the energy input of the air blower. In this invention therefore, the aforesaid type of recirculating wind tunnel is installed within the aircraft airfoil beneath the outer surface of the airfoil so that the high velocity airflow produced within the wind tunnel arrangement may induce airflow over the airfoil by means of an opening on top of the airfoil communicating with the upper channel of the recirculating wind tunnel. Although the opening will reduce the airflow velocity within the wind tunnel arrangement it will nevertheless remain of sufficient magnitude so as to produce a considerable flow of air over the airfoil surfaces so as to produce aerodynamic lift on the air frame to which the airfoil is connected. It will therefore be appreciated that the aerodynamic lift so induced does not rely on the forward movement or propulsion of the air frame and is accomplished without the use of any rotating wing arrangement or by directing the thrust means downwardly. Accordingly, the aircraft may take off in a vertical direction and when it is airborne the propulsion units may be made operative to propel the aircraft forwardly at which time the tunnel arrangement may be rendered ineffective by opening a gate thereto at the trailing edge of the airfoil and by preventing return airflow through the return channel of the wind tunnel arrangement so that the aircraft may be sustained in forward flight by the usual aerodynamic lift induced on the airfoil because of the movement thereof through the air.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view illustrating a typical type of high speed aircraft utilizing the vertical lift feature of this invention.

FIGURE 2 is a perspective view of the aircraft illustrated in FIGURE 1.

FIGURE 3 is a sectional view taken through a plane indicated by section line 3—3 of FIGURE 1.

Referring to the drawings in detail, reference numeral 10 generally indicates an aircraft of the high speed type which includes an airfoil wing 12 extending from both sides of the fuselage 14 and including a pair of forward thrust propulsion units of the jet engine type 16 suspended below the airfoil wing 12 on either side of the fuselage 14. The vertical lift mechanism for the aircraft 10 generally indicated by reference numeral 18 as seen in FIGURES 1 and 2 may extend across the airfoil wing 12 at its juncture with the fuselage 14.

Referring now to FIGURE 3, the vertical lift mechanism 18 will be seen with greater detail. It will therefore be observed that the airfoil 12 is of the usual outer surface cross-sectional configuration and includes a top surface portion 20 having a trailing edge 22 and a forward edge 24, said top surface portion 20 being of such shape as to provide the required camber for the airfoil 12. The lower surface portion 26 accordingly also extends between the trailing edge 22 and the forward leading edge 24. It will therefore be appreciated that airflow over the upper and lower surfaces 20 and 26 of the airfoil 12 will induce aerodynamic lift on the airfoil as is well known to those skilled in the art. In the usual case however, the airflow over the airfoil occurs as a result of powered movement or propulsion of the aircraft. In the present case however airflow over the airfoil 12 is induced without forward movement of the aircraft by means of the return flow vertical lift mechanism 18.

The vertical lift mechanism 18 therefore includes a wind tunnel arrangement of the recirculating type which is formed by an upper channel portion 28 defined by the upper surface 20 of the airfoil and an inner wall 30. The upper channel portion 28 is connected to a lower channel or return channel portion 32 at the leading edge 24 and trailing edge 22. The return channel 32 is therefore defined by the lower surface 26 of the airfoil 12 and an inner wall 34. It will also be observed, that an opening is provided on the top surface 20 of the airfoil 12, said opening 36 therefore being in communication with the upper channel 28 of the wind tunnel arrangement.

An air pump unit 38 which may include a motor and propeller unit or air blower unit is mounted within the upper channel 28 and includes an inlet end 40 which is disposed at the rearward portion of the opening 36 and also includes an outlet end 42 disposed intermediate the leading and trailing edge of the airfoil 12 within the upper channel 28. Accordingly, operation of the air pump unit 38 will draw air in through the inlet 40 thereof and expel air from its outlet end 42 at a higher velocity.

Referring now to the return channel 32 it will be observed that a gate 44 is pivotally mounted on the lower surface 26 of the airfoil 12 which also constitutes the terminal end of the upper channel 28 at its juncture with the return channel 32, said gate 44 when positioned in its illustrated position of FIGURE 3 confining the flow of air from the outlet 42 of the air pump unit so as to force it into the return channel 32 as indicated by the arrows in FIGURE 3. When the gate 44 is open however, airflow from the outlet end 42 of the air pump unit 38 will proceed outwardly from the airfoil 12 as indicated by the dotted arrows in FIGURE 3. In connection with the flow of air into the return channel 32 however it will be observed that a flap 46 is provided and when actuated to the position illustrated in FIGURE 3 will admit the airflow into the return channel 32 while in a closed position as shown by dotted line in FIGURE 3, said flap 46 will prevent the return of air through the return channel 32. Also, located adjacent the leading edge 24 within the return channel 32 is a second flap 48 which will permit the return of air from the return channel 32 into the upper channel 28 when the flap 48 is in its open position as illustrated in FIGURE 3. When the flap 48 is in its closed position, however, as illustrated by dotted line in FIGURE 3, it will prevent the admission of air from upper channel 28 into the return channel 32. Also disposed adjacent the leading forward edge 24 but located within the upper channel 28 is a nose flap 50 which in its illustrated position of FIGURE 3 is flush with the airfoil surface 20. However, when the nose flap 50 is moved to its open position as illustrated by dotted line in FIGURE 3, air will be admitted through the opening 52 in the upper surface 20 of the airfoil adjacent the leading edge 24.

From the foregoing description, operation of the vertical lift mechanism and the aircraft in general will become apparent. To take off therefore, the lift mechanism 18 will be in its FIGURE 3 illustrated condition wherein the air pump unit 38 is then operated so as to induce a flow of air through the wind tunnel formed by the upper channel 28 and the return channel 32 within the airfoil 12. It will therefore be appreciated as hereinbefore indicated that a high velocity airflow is produced by virtue of the velocity imparted to the air by means of the air pump 38 and return of said airflow through the converging return channel 32 so as to create a high velocity airflow. Accordingly, the high velocity airflow communicating with the outside air by means of the opening 36 will induce airflow over the airfoil 12 as indicated by the arrows. Such airflow over the airfoil 12 is therefore of a greater magnitude than would be possible by the mere use of an air pump or air blower itself. Accordingly, as a result of such airflow over the airfoil 12 an aerodynamic lift will be induced on the airfoil 12 of sufficient magnitude to enable vertical take-off of the air frame connected to the airfoil 12. When the aircraft is airborne therefore, the forward thrust propulsion unit 16 will be fired in order to induce forward movement to the air frame. During the transition period between vertical and forward flight, the nose flap 50 will be opened to the position illustrated by dotted line in FIGURE 3 so as to take advantage of the air moving relative to the airfoil 12 by virtue of the forward movement of the aircraft for increasing the airflow through the wind tunnel chanels 28 and 32 so as to induce an additional amount of lift. During the latter transition period, the flap 48 is moved to its position illustrated by dotted line in FIGURE 3 so as to prevent the flow of air in a reverse direction through the return channel 32. When the aircraft is moving forwardly at a sufficiently high velocity, the lift mechanism 18 will be rendered inoperative by opening the gate 44 and closing the gate 46 so as to permit the airflow from the rear end 42 of the air pump 38 to escape outwardly from the airfoil and at the same time prevent return flow of air through the return channel 32. The aircraft is then sustained in flight by virtue of the aerodynamic lift induced on the airfoil 12 by virtue of its forward movement through the air. A flap may if desired be provided for closing opening 36 during normal forward flight to reduce drag.

In FIGURES 1 and 2 it will be observed that a plurality of air pump units 38 are provided. The number of such unit 38 will depend on the design and lift requirements on the aircraft. Also, the size of the opening 36 and the cross-sectional extent of the channel portion of the wind tunnel arrangement will depend on the vertical lift requirement. It will therefore be appreciated from the foregoing description and explanation that this invention enables the use of modern high speed aircraft in a more efficient and facile manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an aircraft including an airfoil and an air frame propelling thrust means, vertical take-off lift means comprising, recirculating wind tunnel means mounted within said airfoil creating high velocity airflow within said airfoil, a wind tunnel opening means disposed on top of said airfoil in communication with said airflow of the tunnel means for inducing airflow over said airfoil and produce vertical aerodynamic lift on the airfoil without relying on forward propulsion of the air frame, control means actuated following propulsion of the air frame by the propelling thrust means when the aircraft is airborne preventing recirculation of airflow through said wind tunnel means so as to eliminate the aerodynamic lift influence of said wind tunnel means, said recirculating wind tunnel means comprising a continuous airflow channel means including an upper channel portion beneath a top surface of said airfoil connected to a lower return channel portion disposed above a lower surface of said airfoil, air pump means disposed within said upper channel portion intermediate the leading and trailing edge of said airfoil and said tunnel opening means being disposed in said upper channel portion forwardly of said air pump means.

2. The combination as defined in claim 1, wherein said control means comprises gate means between said upper and lower channel portions at the trailing edge of the airfoil for selectively confining the airflow from the air pump means within the channel means and preventing return airflow through said lower channel portion.

3. The combination as defined in claim 2, including transition control means disposed in said upper channel portion adjacent a forward edge of the airfoil for admitting air into said upper channel during forward propulsion of the aircraft in the transition from vertical to forward flight.

4. In combination with an aircraft including an airfoil and an air frame propelling thrust means, vertical take-off lift means comprising, recirculating wind tunnel means mounted within said airfoil creating high velocity airflow within said airfoil, a wind tunnel opening means disposed on top of said airfoil in communication with said airflow of the tunnel means for inducing airflow over said airfoil and produce vertical aerodynamic lift on the airfoil without relying on forward propulsion of the air frame, said recirculating wind tunnel means comprising a continuous airflow channel means including an upper channel portion beneath a top surface of said airfoil connected to a lower return channel portion disposed above a lower surface of said airfoil, air pump means disposed within said upper channel portion adjacent a trailing edge of said airfoil and said tunnel opening means being disposed in said upper channel portion forwardly of said air pump means.

References Cited in the file of this patent
UNITED STATES PATENTS

| | | |
|---|---|---|
| 2,352,144 | Woods | June 20, 1944 |
| 2,511,504 | Hawkins | June 13, 1950 |